(12) United States Patent
Ito

(10) Patent No.: US 9,019,529 B2
(45) Date of Patent: Apr. 28, 2015

(54) PRINT SERVER AND CONTROL METHOD FOR FACILITATING PRINTING WITH AN UNREGISTERED DEVICE

(75) Inventor: Morikazu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 13/278,635

(22) Filed: Oct. 21, 2011

(65) Prior Publication Data

US 2012/0133973 A1    May 31, 2012

(30) Foreign Application Priority Data

Nov. 30, 2010   (JP) ................................. 2010-267501

(51) Int. Cl.
*G06K 15/02*   (2006.01)
*G06F 3/12*    (2006.01)

(52) U.S. Cl.
CPC ............ *G06F 3/1287* (2013.01); *G06F 3/1203* (2013.01); *G06F 3/122* (2013.01); *G06F 3/1226* (2013.01); *G06F 3/1231* (2013.01); *G06F 3/1232* (2013.01); *G06F 3/1288* (2013.01); *G06F 3/1289* (2013.01)

(58) Field of Classification Search
USPC ............. 358/1.15, 1.18; 710/8, 9, 10; 399/81; 715/700
See application file for complete search history.

(56) References Cited

U.S. PATENT DOCUMENTS

| | | | | |
|---|---|---|---|---|
| 2003/0217194 A1* | 11/2003 | Kazumi et al. | ................ | 709/321 |
| 2006/0221356 A1* | 10/2006 | Kawai | ............................. | 358/1.1 |
| 2010/0171973 A1* | 7/2010 | Kimura | ........................ | 358/1.14 |
| 2012/0026536 A1* | 2/2012 | Shah | ............................. | 358/1.15 |

FOREIGN PATENT DOCUMENTS

JP    2010160579 A    7/2010

* cited by examiner

*Primary Examiner* — Peter K Huntsinger
(74) *Attorney, Agent, or Firm* — Fitzpatrick, Cella, Harper & Scinto

(57) ABSTRACT

A print server receives a print instruction from a client terminal and causes printing to be performed by a print device selected by the client terminal out of print devices registered with the print server. If a print device unregistered with the print server is selected, the print server acquires device information about the unregistered print device via the client terminal. The print server generates a print setting screen for the unregistered print device from the acquired device information and transmits the print setting screen to the client terminal. The print server further generates print data for the unregistered print device from print settings set by the client terminal on the transmitted print setting screen, and causes the printing to be performed.

6 Claims, 11 Drawing Sheets

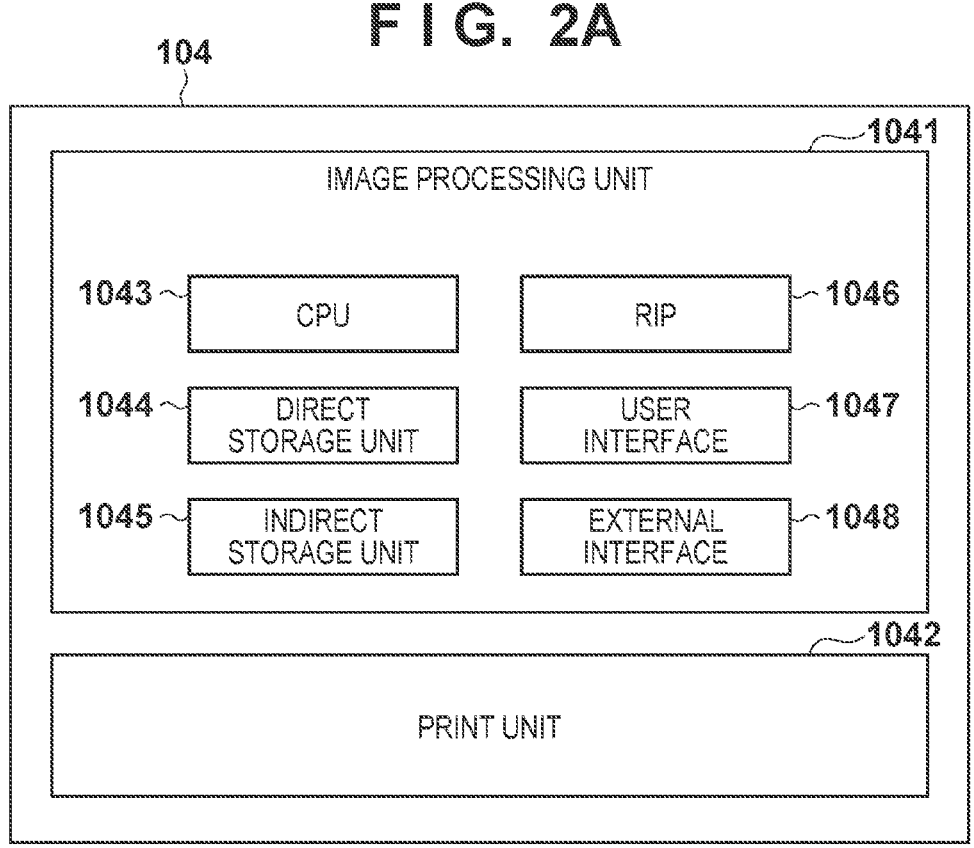
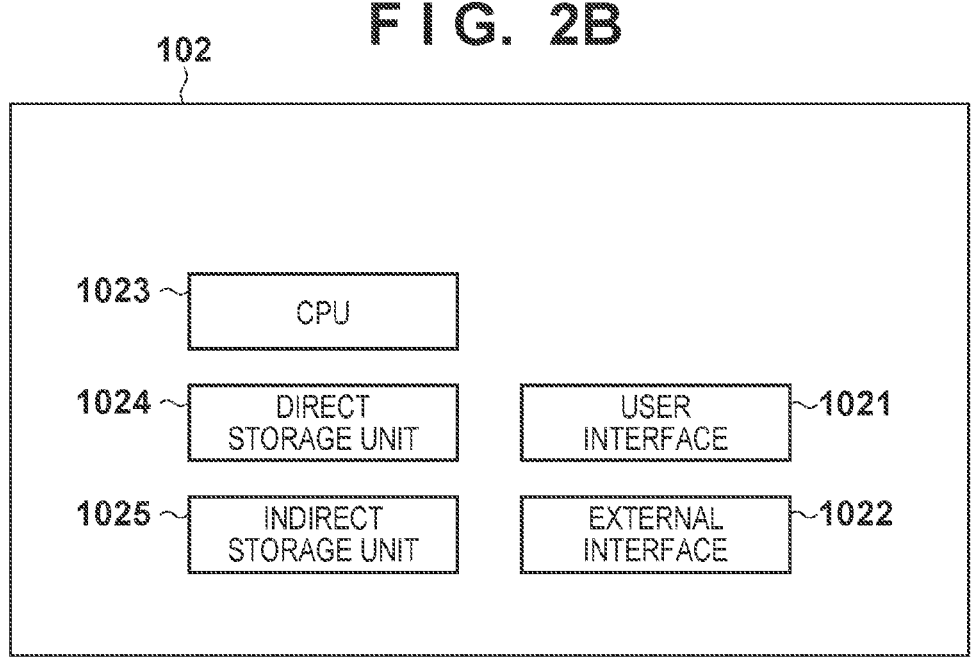

PRINT SERVER AND CONTROL METHOD FOR FACILITATING PRINTING WITH AN UNREGISTERED DEVICE

BACKGROUND OF THE INVENTION

1. Field of the Invention

The present invention relates to a technique that causes printing instructed by a client terminal to be performed by a print device via a print server on the Internet.

2. Description of the Related Art

With reductions in communication costs due to increased broadband communications, and improvements in network environments, the use of SaaS (Software as a Service) for providing software functions as services on the Internet has been spreading.

SaaS has become a business model for providing a software function as a "service" via the Internet and obtaining the revenue in a form such as a monthly usage fee, rather than selling packaged software in the form of "licensing" and obtaining the revenue as has been conventional practice.

Even for print systems that have conventionally managed printers and print jobs on a network within a local area such as an office, support for SaaS is becoming a requirement as a print service on the Internet.

Besides SaaS, thin clients (clients that use only server-side programs and no client-side programs) provided with only a web browser are expected to become common. For SaaS, software such as applications does not need to be installed into a terminal, such as a personal computer, serving as a client. Accordingly, introducing a thin client has significant advantages for a user, including a reduction in the cost of managing software distributed to the client and prevention of information leakage owing to no data stored in the client. Thus, support for thin clients in SaaS is also an important issue for print systems.

Printers managed in a print system generally vary in function and specification. Therefore a user has to register printer configuration information with a server (a print server) of the print system in advance. According to the registered configuration information, the print server may provide a user interface with which the user sets print properties at the time of printing, and may provide the function of tracking a print job until the completion of printing.

A typical manner for the user to register the printer configuration information with the print server is such that the user directly inputs the printer configuration information in a printer registration user interface provided by the print system. According to this manner, the user needs to have a complete knowledge of the printer configuration information. In addition, if the registration requires input for many entries of the configuration information, the input is cumbersome.

In order to solve the above inconveniences, a method for facilitating the input of the printer configuration information has been proposed (for example, see Japanese Patent Laid-Open No. 2010-160579).

Now, if a printer to be registered will be continuously used, registering the printer will facilitate the future use. However, it may be desired to perform printing without registering the printer information with the print server, such as when the printer is temporarily used for printing, and this desire has not been fulfilled. For example, if one desires to print electronic data with a printer provided in a hotel where he stays on business or in a convenience store, conventionally the printer information needs to be registered with a server even for the one-time use.

SUMMARY OF THE INVENTION

The present invention provides a print server that can cause a print device unregistered with the print server to perform printing without requiring cumbersome device information registration when a client terminal temporarily uses the unregistered print device, and a control method for the print server.

According to an aspect of the present invention, there is provided a print server that receives a print instruction from a client terminal and causes printing to be performed by a print device selected by the client terminal out of print devices registered with the print server, comprising: an acquisition unit that acquires device information about a print device unregistered with the print server via the client terminal if the unregistered print device is selected; a transmission unit that generates a print setting screen for the unregistered print device from the device information acquired by the acquisition unit and transmits the print setting screen to the client terminal; and a control unit that generates print data for the unregistered print device from print settings set by the client terminal on the print setting screen transmitted by the transmission unit and causes the printing to be performed.

Further features of the present invention will become apparent from the following description of exemplary embodiments (with reference to the attached drawings).

BRIEF DESCRIPTION OF THE DRAWINGS

FIG. 2A is a diagram showing the internal configuration of a print device, and FIG. 2B is a diagram showing the internal configuration of a print server and a client terminal;

DESCRIPTION OF THE EMBODIMENTS

With reference to the drawings, embodiments for implementing the present invention will be described in detail below.

<Configuration of Print System>

First, an example of the configuration of a print system will be described using FIG. 1. The print system includes devices interconnected via networks 111 and 112 and the Internet 101. Exemplary devices may be a print server 102, client terminals 103, and a print device 104. The networks 111 and 112 are communication lines for exchanging information between the devices. The Internet 101 is a communication line for exchanging information between the devices over a firewall.

Figure 1:
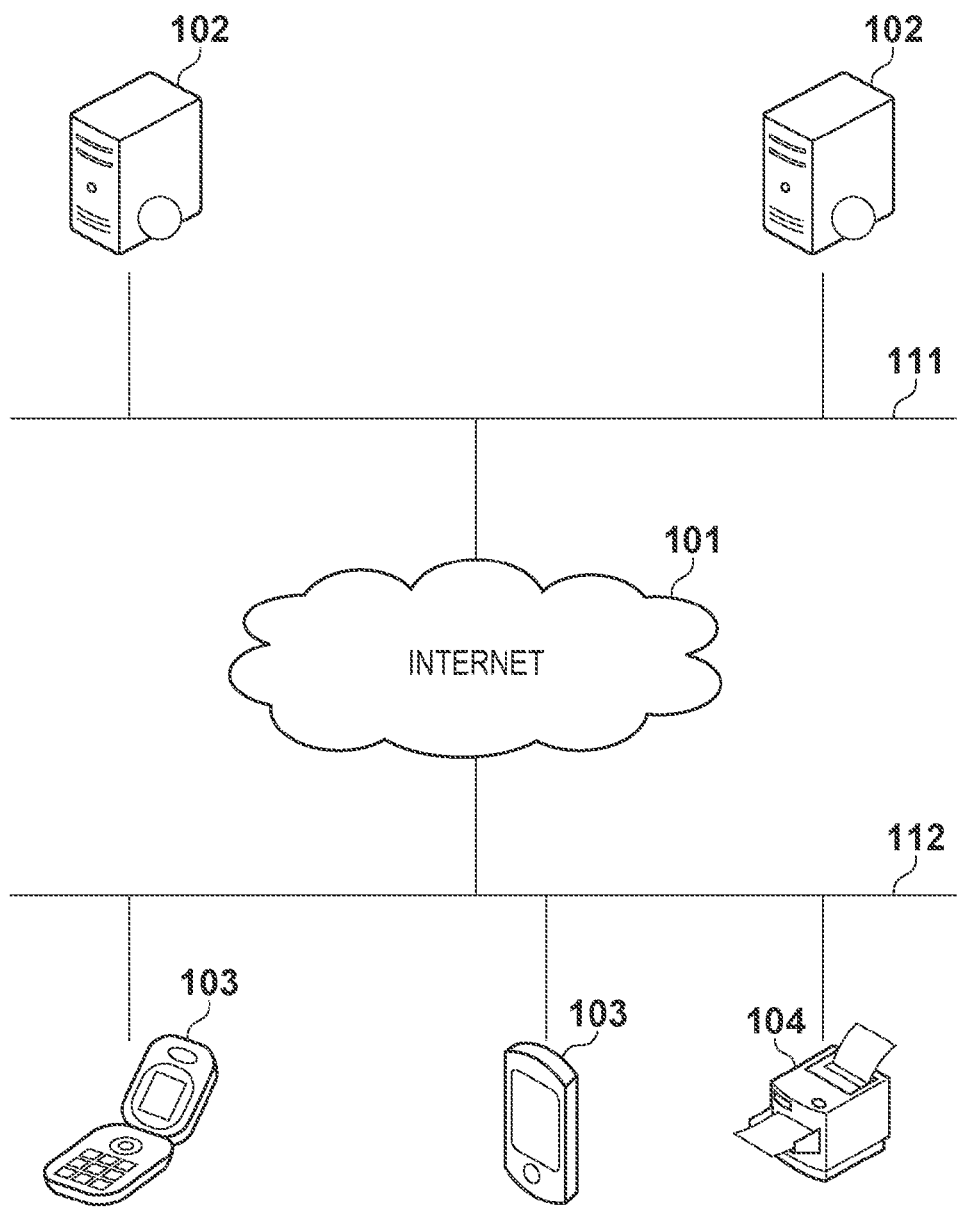
FIG. 1 is a diagram showing an example of the configuration of a print system.

In the example shown in FIG. 1, the network 111 to which the print server 102 belongs and the network 112 to which the client terminals 103 belong can communicate with each other over the firewall through the Internet 101.

The networks 111 and 112 and the Internet 101 are communication networks supporting protocols such as TCP/IP and may be wired or wireless. The print server 102, although depicted as a single server, is assumed to include a number of server computers.

The internal configuration of each device constituting the print system will be described in detail. First, the internal configuration of the print device 104 will be described using FIG. 2A. FIG. 2A is a block diagram illustrating the internal configuration of the print device 104.

The print device 104 includes an image processing unit 1041 and a print unit 1042. The image processing unit 1041 includes a CPU 1043, a direct storage unit 1044, an indirect storage unit 1045, an RIP 1046, a user interface 1047, and an external interface 1048.

The CPU 1043 executes programs stored in locations such as ROM and a hard disk device and instructs various sorts of control for the print device 104. The CPU 1043 may be a multiprocessor. The direct storage unit 1044 is work memory (RAM) used as a work area when the CPU 1043 executes the programs, and the programs executed by the CPU 1043 are loaded into the direct storage unit 1044.

The indirect storage unit 1045 stores various programs, including application programs and platform programs. The various programs stored in the indirect storage unit 1045 are read into the direct storage unit 1044 when the CPU 1043 executes the programs. The indirect storage unit 1045 is implemented by an SSD (Solid State Drive) or an HDD (Hard Disc Drive). The RIP 1046 converts print data into a raster image (bitmap). Here, the raster image is stored in the direct storage unit 1044 as needed and subjected to various sorts of image processing such as γ-conversion and color processing.

The user interface 1047 is a component necessary for receiving processing requests from a user. For example, the user interface 1047 receives a signal corresponding to an instruction that is input by the user through a keyboard or a mouse. The external interface 1048 controls data reception and transmission from and to external devices. The external devices may include an external storage device such as an external HDD or external USB memory, or a separate device such as a separate host computer or image forming device connected via a network.

The print unit 1042 receives, from the image processing unit 1041, input of the raster image subjected to the image processing in the image processing unit 1041 and performs printing.

The print device 104 can communicate with the client terminals 103 connected to the network 112, and with the print server 102 connected to the network 111 via the Internet 101.

Next, the internal configuration of the print server 102 and the client terminals 103 will be described using FIG. 2B. As information processing devices, the print server 102 and the client terminals 103 have the same configuration (functions), and therefore the print server 102 will be described here by way of example.

The print server 102 includes a user interface 1021, an external interface 1022, a CPU 1023, a direct storage unit 1024, and an indirect storage unit 1025. The user interface 1021 is a component necessary for receiving processing requests from a user. For example, the user interface 1021 receives a signal corresponding to an instruction that is input by the user through a keyboard, a mouse, or a touch panel. The external interface 1022 is connected to the network 111 and controls communications with other devices connected to the network 112.

The CPU 1023 executes programs stored in locations such as ROM and a hard disk device and instructs various sorts of control for the print server 102. The CPU 1023 may be a multiprocessor. The direct storage unit 1024 is work memory (RAM) used as a work area when the CPU 1023 executes the programs, and the programs executed by the CPU 1023 are loaded into the direct storage unit 1024.

The indirect storage unit 1025 stores various programs, including application programs and an OS (Operating System). The various programs stored in the indirect storage unit 1025 are read into the direct storage unit 1024 when the CPU 1023 executes the programs. The indirect storage unit 1025 is implemented by ROM or an HDD.

<Functions of Devices>

Figure 3:
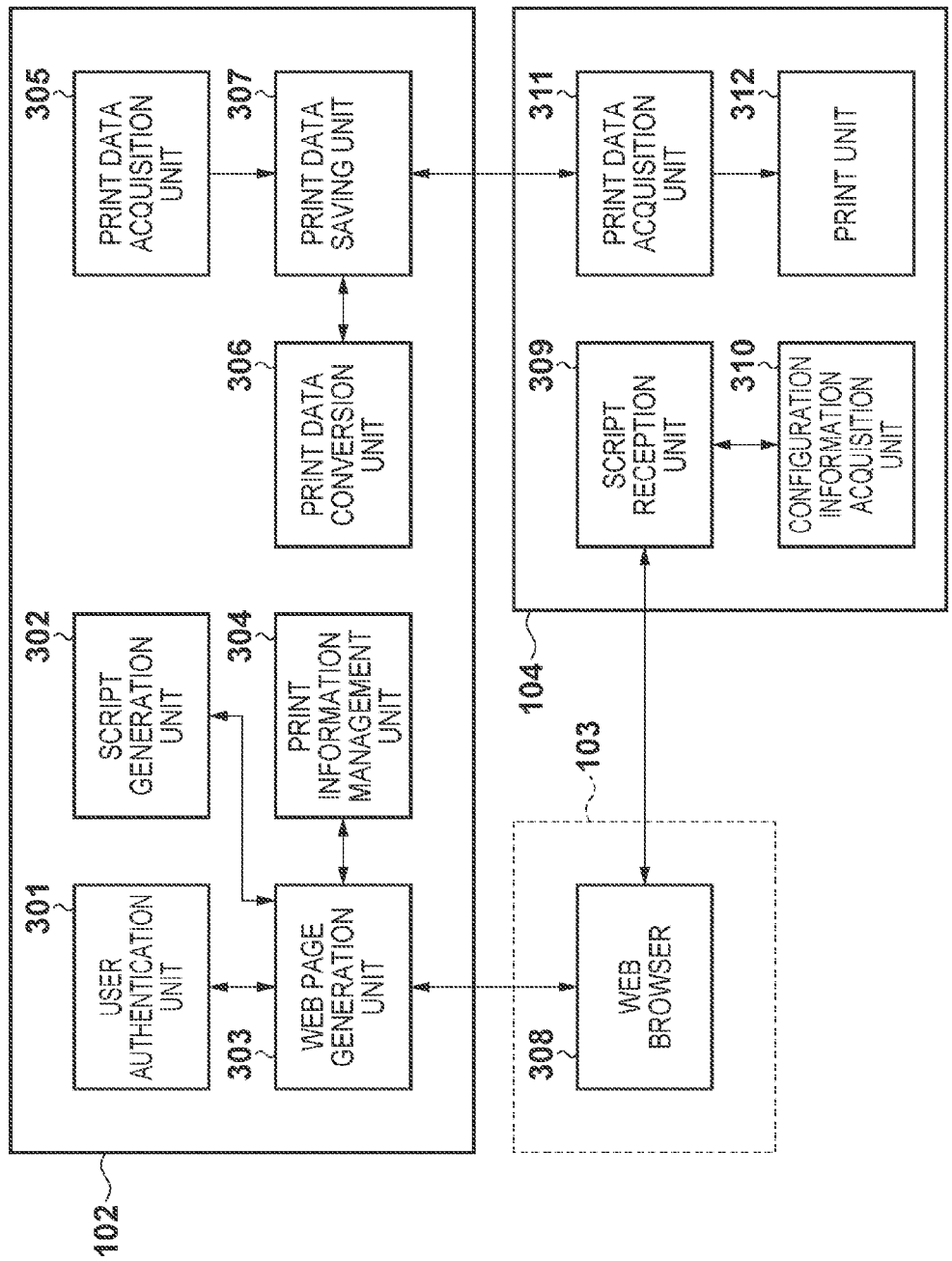
FIG. 3 is a block diagram showing functions of the devices in the print system.

Functions of the devices in the print system will be described in detail with reference to FIG. 3. FIG. 3 is a block diagram showing functions of the devices in the print system. First, functions of the print server 102 will be described.

The print server 102 includes functions as a user authentication unit 301, a script generation unit 302, a web page generation unit 303, a printer information management unit 304, a print data acquisition unit 305, a print data conversion unit 306, and a print data saving unit 307.

The web page generation unit 303 generates a response to a print request from the client terminal 103. Here, the web page generation unit 303 generates various operation screens for providing a print service to the client terminal 103. Exemplary operation screens may include a user authentication screen, a print device list, a screen on which a client inputs information identifying a device to be used for printing, and a print setting screen.

The user authentication unit 301 identifies a user who uses the print server 102. If the user desires printing with a print device that is outside the management of the print server 102, the script generation unit 302 generates a script for acquiring print device information. Print information acquired here is managed by the printer information management unit 304 and displayed by the web page generation unit 303 to the user as the print setting screen.

The print data acquisition unit 305 acquires print data specified by the user from inside the print server 102 or from the user's client terminal 103. The acquired print data is converted by the print data conversion unit 306 into data suitable to be processed by the print device 104, and saved in the print data saving unit 307.

Next, functions of the client terminal 103 will be described. The client terminal 103 includes a web browser 308 for transmitting a print request to the print server 102 via the external interface 1022 and displaying the print setting screen returned as a response to the print request.

Next, functions of the print device 104 will be described. The print device 104 includes a script reception unit 309, a configuration information acquisition unit 310, a print data acquisition unit 311, and a print unit 312. The script reception unit 309 receives a device information acquisition script generated by the print server 102. The configuration information acquisition unit 310 acquires configuration information about the print device 104 and returns the configuration information to the print server 102. The print data acquisition unit 311 acquires print data from the print server 102. The print unit 312 prints the acquired print data.

<Print Process with Unregistered Print Device>

Figure 4:
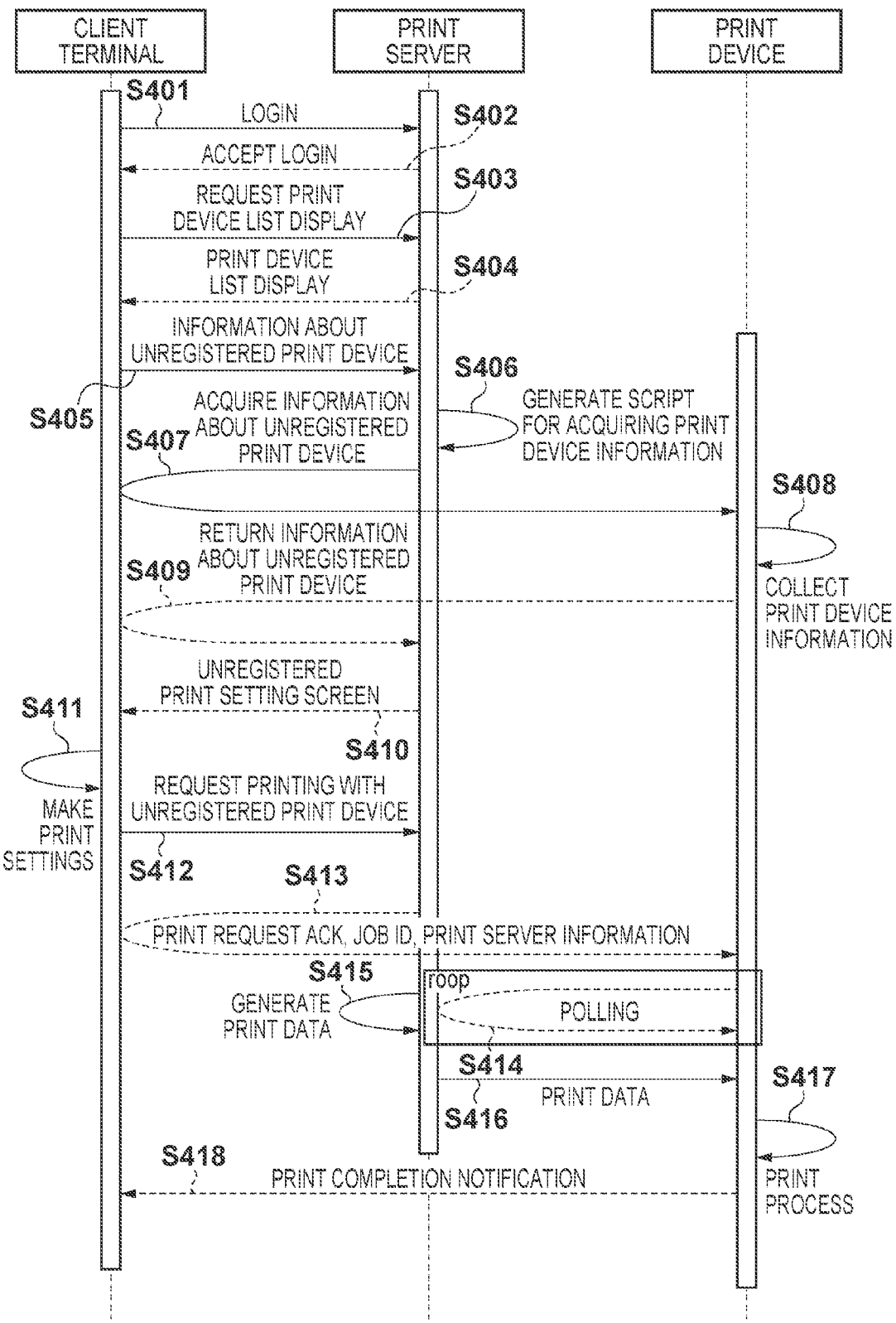
FIG. 4 is a diagram showing a print process sequence with an unregistered print device.
Figure 5:
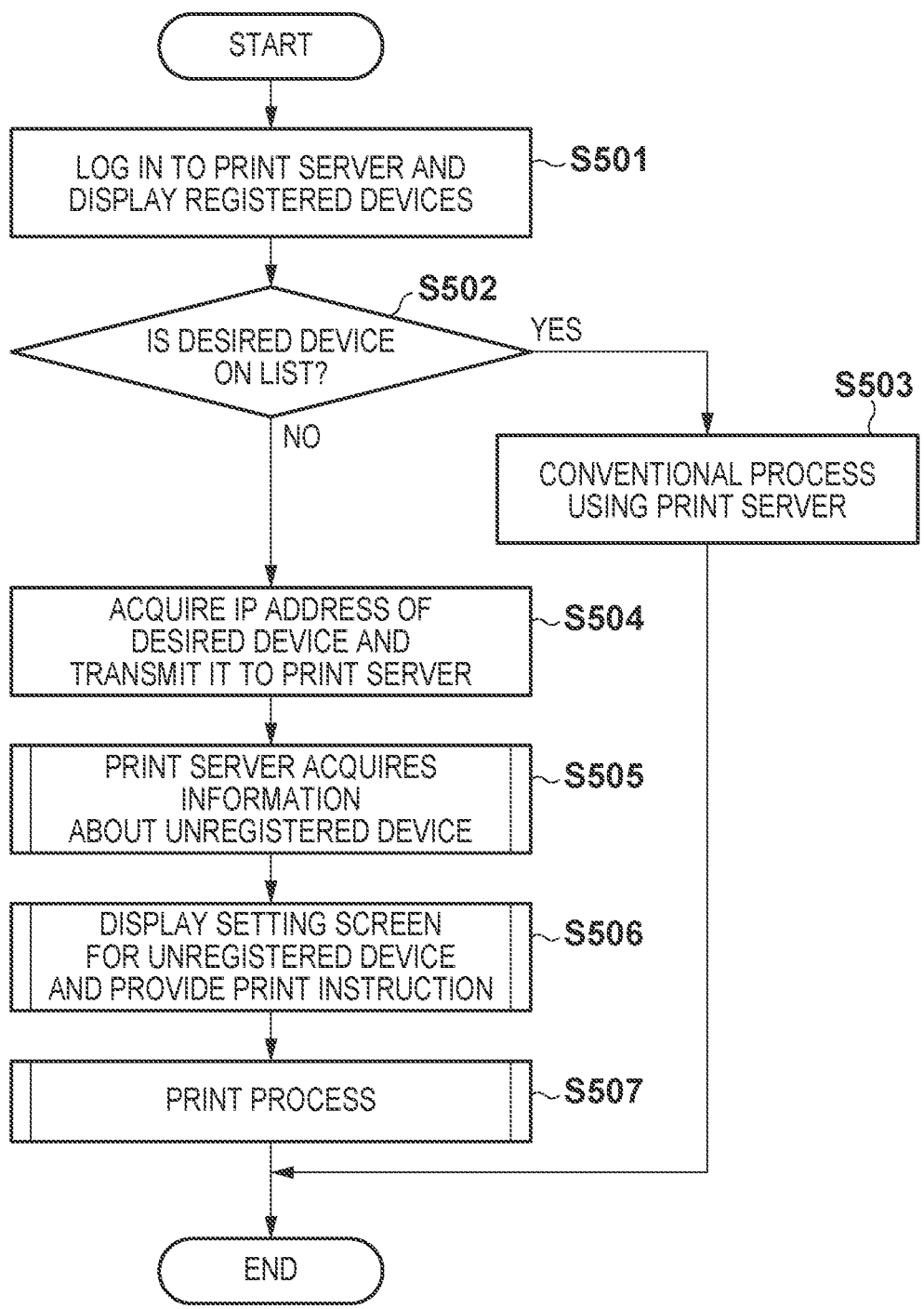
FIG. 5 is a flowchart showing the overall process of printing in the print system.
Figure 6:
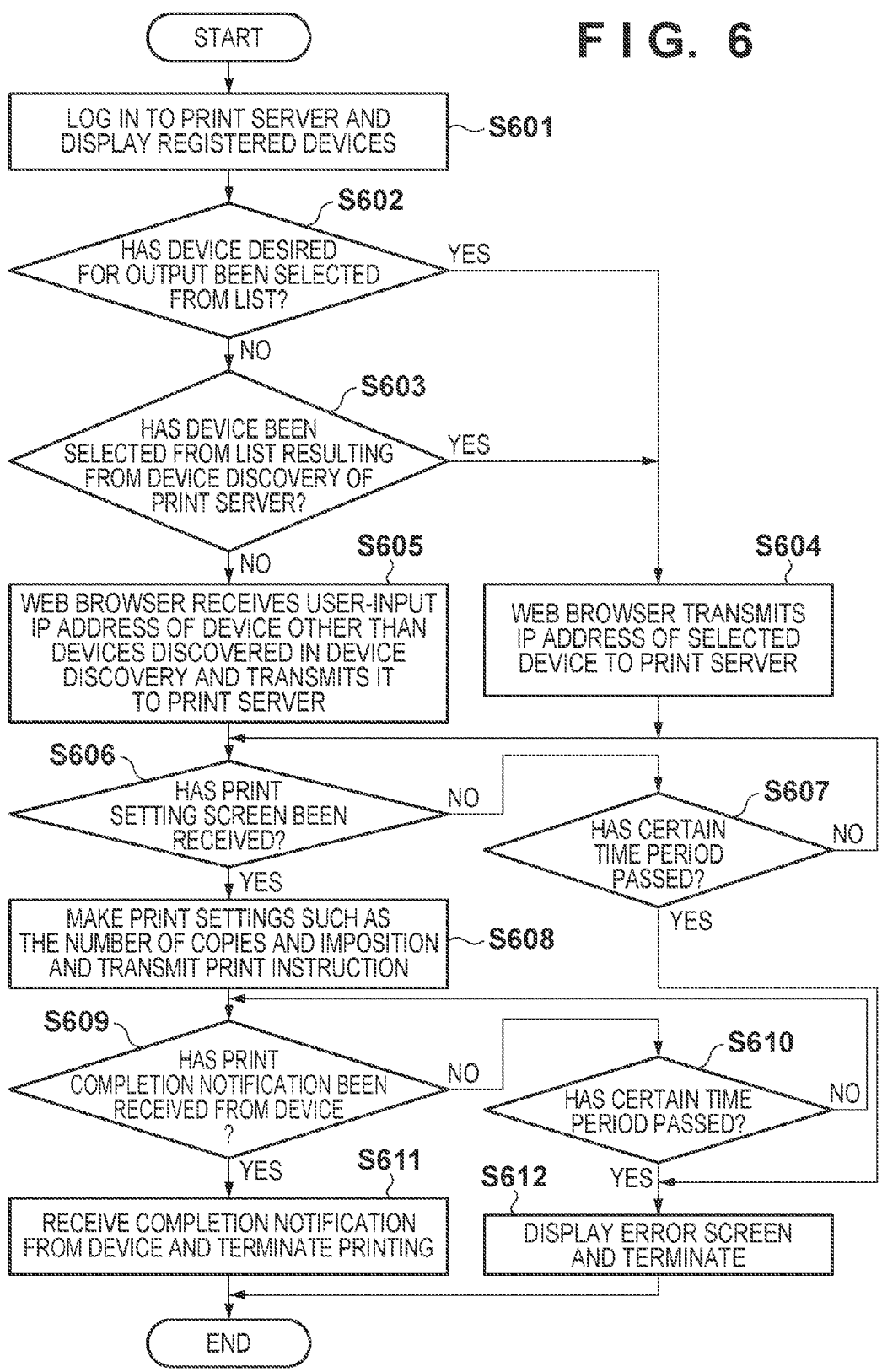
FIG. 6 is a flowchart showing a process in the client terminal.
Figure 7:
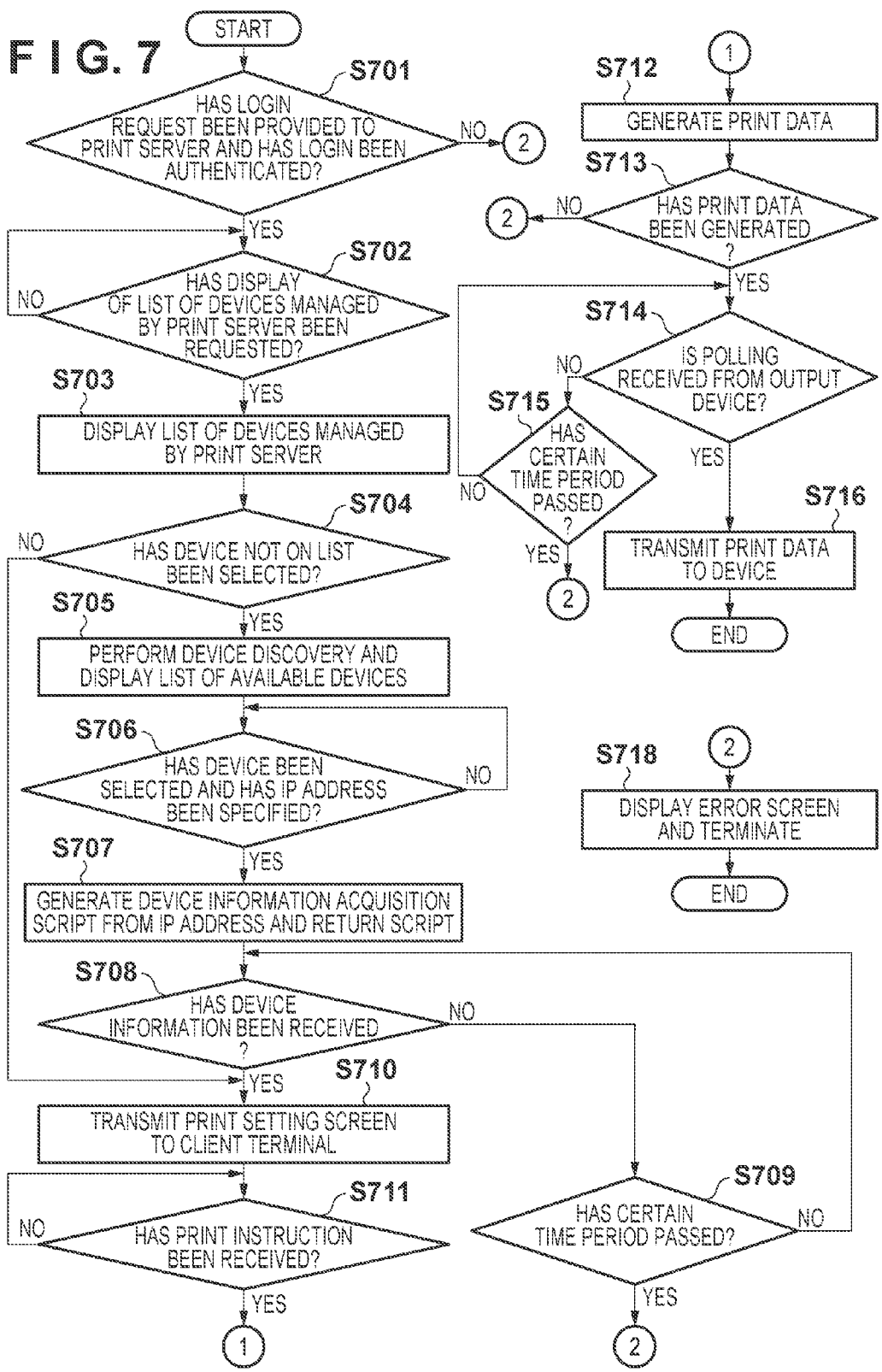
FIG. 7 is a flowchart showing a process in the print server.
Figure 8:
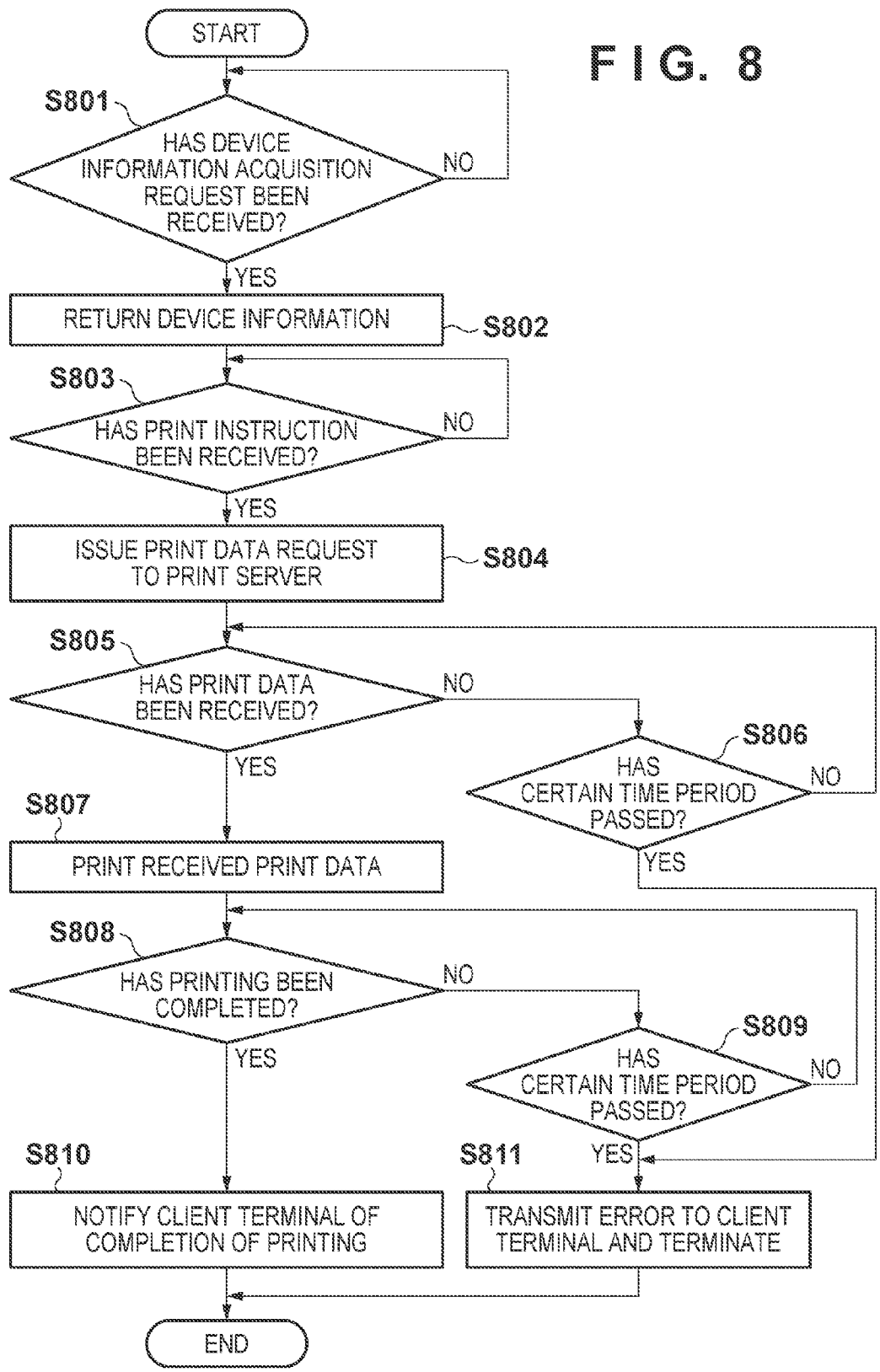
FIG. 8 is a flowchart showing a process in the print device.

According to the above configuration, processes will be described using FIGS. 4 to 8 in which the user of the client terminal 103 performs printing by temporarily using a print device unregistered with the print server 102. FIG. 4 is a diagram showing a print process sequence with the unregistered print device. FIG. 5 is a flowchart showing the overall process of printing in the print system. FIG. 6 is a flowchart showing a process in the client terminal. FIG. 7 is a flowchart showing a process in the print server. FIG. 8 is a flowchart showing a process in the print device.

First, in S601, when the user instructs printing for an application through the client terminal 103, the web browser 308 accesses the web page generation unit 303 of the print server 102 and provides a login request (S401). In response to the login request, in S701, the user authentication unit 301 in the print server 102 prompts to input a user ID and a password and determines whether or not the input user ID and password are correct. If it is determined that the input user ID and password are not correct, the process proceeds to S718 to transmit an error screen to the web browser 308 of the client terminal 103 and terminates. If the input user ID and password are correct, the process proceeds to S702 to accept the login (S402) and wait for a request to display a list of devices managed by the print server 102 in S702. Thereafter, if the request to display the device list is received from the client terminal 103 (S403), the process proceeds to S703. In S703, the device list managed by the printer information management unit 304 is transmitted to the web browser 308 of the client terminal 103 (S404) and displayed as a list of registered print devices (S501).

Figure 10:
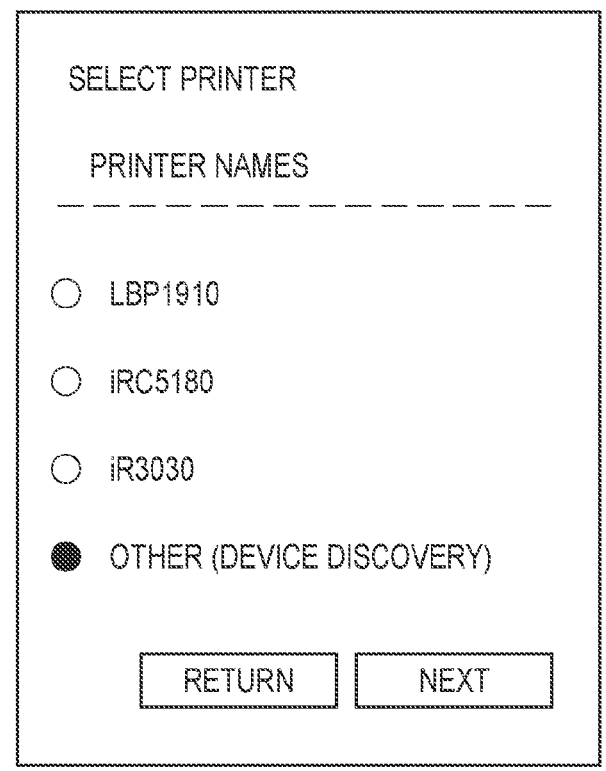
FIG. 10 is a diagram showing an exemplary display of a device list displayed in a web browser.

FIG. 10 is a diagram showing an exemplary display of the device list displayed in the web browser. As shown in FIG. 10, the names of print devices registered with the print server 102 are displayed as a list, which also includes a choice "other (device discovery)." The device discovery here refers to a process of multicasting a SOAP message based on the UDP protocol to discover devices available for printing.

In S602, from the device list display, the user selects a print device to be used for printing, or selects "other (device discovery)" for further selecting a print device to be temporarily used (S502). If a print device is selected from the device list display, the process proceeds to S604 to transmit an IP address of the selected print device to the print server 102. If "other (device discovery)" is selected, the process proceeds from S603 to S604, where an IP address of a print device selected by the user from display of a list of available devices discovered in the device discovery is transmitted to the print server 102. In a case that a print device is selected from the device list display, including a case that a print device is selected after "other" is selected, a regular print process using the print server 102 is performed (S504).

Here, a process in the print server 102 in response to the print device selection process in the client terminal 103 will be described. In S704, if a print device is selected from the device list display, the process proceeds to S710 to transmit a print setting screen. This process will be further described below. If "other (device discovery)" is selected, the process proceeds to S705 to perform the device discovery and transmit a device discovery result shown in FIG. 11 as a list of available devices to the web browser 308 of the client terminal 103. In S706, selection of a print device is waited for. Upon selection of an IP address of a print device or "other (a user-specified IP address)," the process proceeds to S707. The process in S707 will be further described below.

Figure 11:
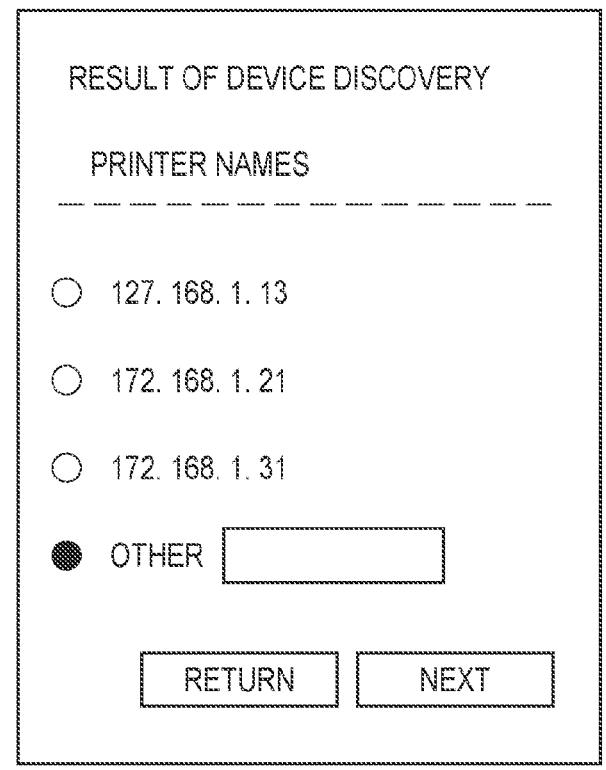
FIG. 11 is a diagram showing an exemplary device discovery result.

If a user-desired print device is not found in the device list display, including the device list display resulting from the device discovery, the process proceeds to S605. In S605, "other" shown in FIG. 11 is selected to input information about an unregistered print device (for example, an IP address), which is transmitted to the print server 102 (S405, S504). Here, the user himself looks up and inputs the IP address assigned to the device. In S606, reception of a print setting screen from the print server 102 is waited for.

In S707, from the received information about the unregistered print device, the script generation unit 302 of the print server 102 generates a script (in this example, the IP address is embedded therein) for acquiring device information (S406). The generated script is transmitted to the unregistered print device (hereinafter assumed to be the print device 104) via the client terminal 103 (S407).

In the print device 104, the script reception unit 309 receives the script from the client terminal 103 in S801. In S802, the script is interpreted to collect the device information by the configuration information acquisition unit 310 (S408). The collected device information is transmitted from the script reception unit 309 to the print server 102 via the client terminal 103 (S409). Thereafter, in S803, reception of a print instruction from the print server 102 is waited for.

If the print server 102 cannot receive the device information before the lapse of a certain time period in S708 and S709, the process proceeds to S718 to display an error screen in the web browser 308 and terminates. If the device information is received via the client terminal 103 (S505), the process proceeds to S710, where the print setting screen is generated and transmitted to the client terminal 103 and displayed in the web browser 308 (S410). In S711, reception of a print request from the client terminal 103 is waited for.

In S606 above, if the client terminal 103 waiting for the reception of the print setting screen cannot receive the print setting screen before the lapse of a certain time period, the process proceeds to S612 to display an error screen and terminates. However, if the print setting screen is received, the process proceeds to S608. In S608, print settings are made and print data is specified according to the user's instructions on the print setting screen displayed in the web browser 308 (S411). Here, the print settings are made with respect to print data, imposition, double-sided or single-sided, the number of copies, etc. A print request for printing with the unregistered print device 104 is transmitted to the print server 102 (S412, S506), and reception of a print completion notification before the lapse of a certain time period is waited for in S609 and S610. If an error occurs in the print device 104 and the print completion notification cannot be received, the process proceeds to S612 to display an error screen and terminates.

The print server 102, having received the print request from the client terminal 103, proceeds to S712 to transmit a response to the print request to the print device 104 via the client terminal 103 along with a job ID and print server information (S413). The print data acquired by the print data acquisition unit 305 according to the received print request is output to the print data conversion unit 306, and print data suitable for the print device 104 is generated and held in the print data saving unit 307 (S415). Then in S713, it is determined whether or not the generation of the print data has succeeded. If the generation has not succeeded, the process proceeds to S718 to display an error screen and terminates. If the generation has succeeded, polling from the print device 104 is waited for until a certain time period passes in S714 and S715. Thereafter, upon polling from the print device 104, the process proceeds to S716 to add the print data to a polling command of the print server 102 and transmit the polling command to the print device 104 (S416), and terminates.

Here, the print process (S507) in the print device 104 that has received the print instruction from the print server 102 via the client terminal 103 will be described. In S803, upon reception of the print instruction from the print server 102, the process proceeds to S804 to access the print server 102 with reference to the job ID and the print server information received along with the print instruction and perform polling until print data is generated. If the print data cannot be received before the lapse of a certain time period in S805 and S806, the process proceeds to S811 to transmit an error to the client terminal 103 and terminates. If the print data is received in S805 (S416), the process proceeds to S807 to start printing the received print data. Thereafter, upon completion of all the print process (S417), a print completion notification is transmitted to the client terminal 103 indicating that the printing has been completed (S418), and the process terminates.

The client terminal 103, upon receiving the print completion notification, proceeds from S609 to S611, where the print process with the unregistered print device 104 is completed.

<Device without Support for Web Services>

Figure 9:
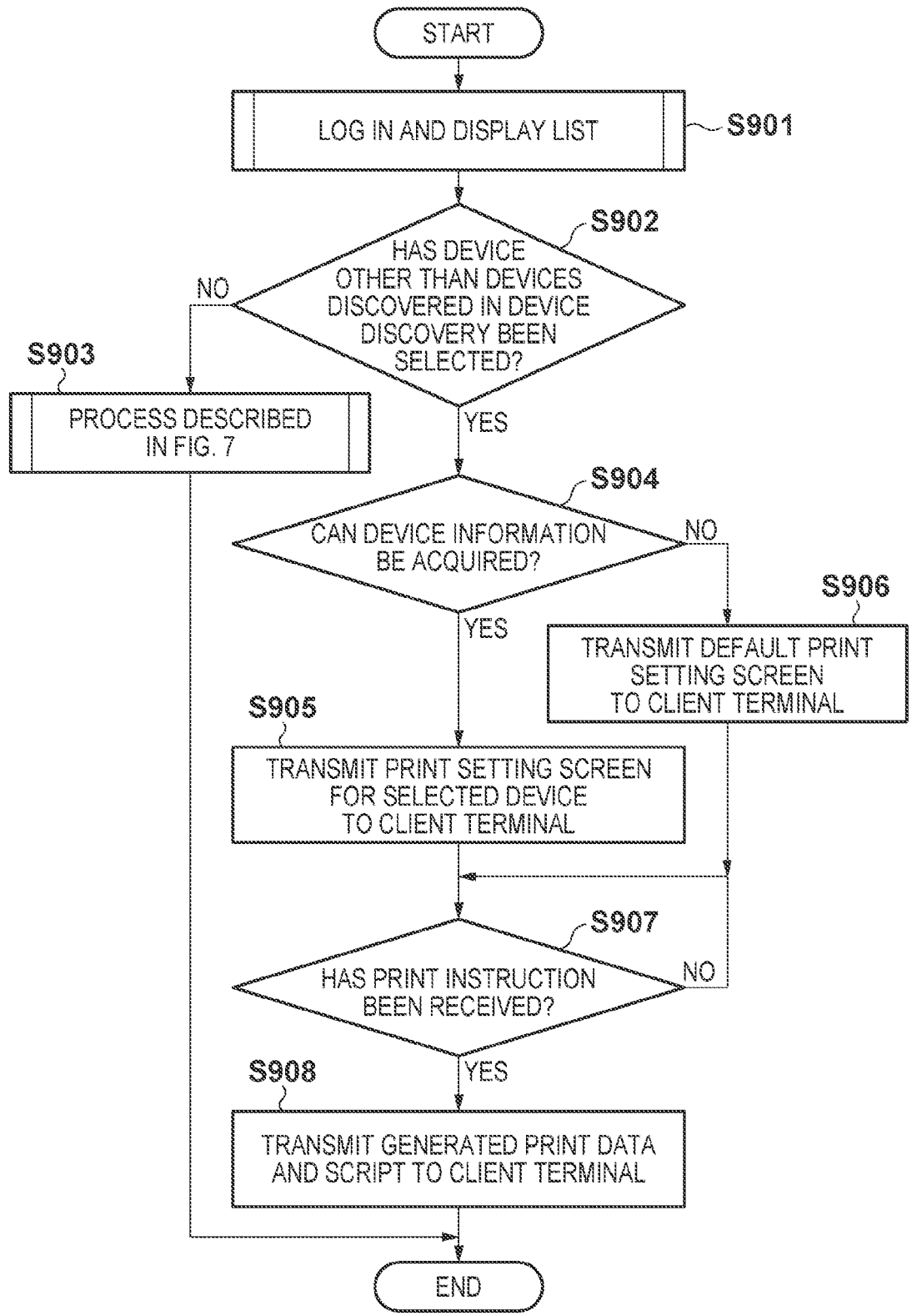
FIG. 9 is a flowchart showing a process in the print server in a case that a print device without support for web services is selected.

The above example has been described for the print device that supports web services. The present invention is also applicable to cases in which the user selects a print device that does not support web services. FIG. 9 is a flowchart showing a process in the print server in a case that a print device without support for web services is selected.

First, in S901, a list of print devices managed by the print server is displayed through the user's login process to the print server and the user's operations. In S902, a list resulting from the device discovery is displayed as desired by the user, and it is determined whether or not a print device that is not on the list, i.e., a print device that does not support web services is selected. If a print device discovered in the device discovery is selected, the process proceeds to S903 to perform the process shown in FIG. 7 and terminates.

If a print device other than the devices discovered in the device discovery is selected in S902, the process proceeds to S904 to determine whether or not device information about the selected print device can be acquired with a device information acquisition script. If the device information can be acquired, the process proceeds to S905 to acquire the device information and transmit a print setting screen depending on the device information to the client terminal 103. If the device information cannot be acquired, the process proceeds to S906 to transmit a default print screen to the client terminal 103.

Then in S907, reception of a print instruction from the client terminal 103 is waited for. Upon reception of the print instruction, the process proceeds to S908 to generate print data according to the print instruction and transmit the print data to the client terminal 103. At this point, a script for transmitting the print data from the client terminal 103 to the print device to be used for printing is transmitted along with the print data, and the process terminates.

<Simple Registration of Unregistered Print Device with Print Server>

Figure 12:
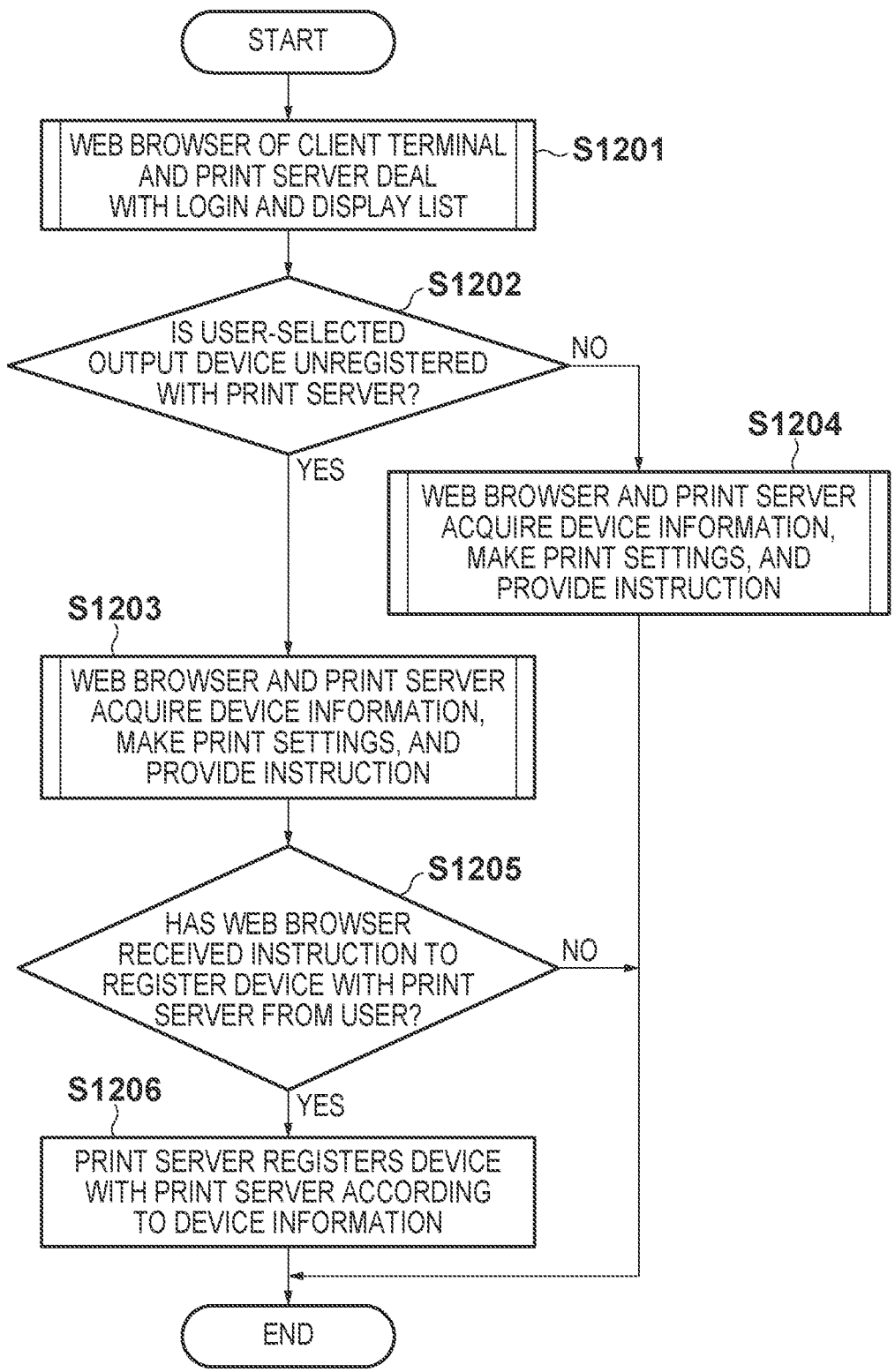
FIG. 12 is a flowchart showing the process of simple registration of an unregistered print device with the print server.

The process of simple registration of an unregistered print device with the print server will be described using FIG. 12. In S1201, the web browser 308 of the client terminal 103 and the print server 102 deal with the user's login, and the web browser 308 displays a list of print devices registered with the print server according to the user's instruction. In S1202, the web browser 308 determines whether or not a user-selected print device is unregistered with the print server 102. If the print device is registered, the process proceeds to S1204, where the web browser 308 and the print server 102 perform the process shown in FIG. 5 such as making print settings and providing a print instruction, and the simple registration process terminates.

If the print device is unregistered in S1202, the process proceeds to S1203, where the web browser 308 and the print server 102 acquire information about the unregistered print device, make print setting, and provide a print instruction. In S1205, the web browser 308 determines whether or not an instruction to register the print device has been provided from the user to the print server 102. If it is determined that the instruction has not been provided, the process terminates. If the instruction has been provided, the process proceeds to S1206, where the print server 102 registers the print device with the print server 102 according to the device information, and the simple registration terminates.

The process of simple registration of an unregistered print device with the print server may be performed when the print completion notification is received from the unregistered print device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-267501, filed Nov. 30, 2010, which is hereby incorporated by reference herein in its entirety.

What is claimed is:

1. A print server that receives a print instruction from a Web browser of a client terminal and causes printing to be performed by a print device unregistered with the print server, comprising:

a transmission unit that transmits, to an authenticated Web browser of the client terminal in response to receiving a request from the Web browser of the client terminal, a Web page on which an IP address of an unregistered print device to be registered with the print server is entered;

a reception unit that receives an IP address of the unregistered print device entered by a user on the Web page displayed by the Web browser of the client terminal;

a generation unit that generates a script that is a program for causing the Web browser of the client terminal to execute a process for acquiring device information about the unregistered print device from the unregistered print device specified by the IP address of the unregistered print device received by the reception unit;

a script transmission unit that transmits the script generated by the generation unit to the Web browser of the client terminal;

an acquisition unit that acquires the device information about the unregistered print device from the Web browser of the client terminal which has acquired the device information about the unregistered print device from the unregistered print device by executing the script generated by the generation unit;

a provision unit that provides a print setting Web page for the unregistered print device to the Web browser, the print setting Web page being created based on the device information acquired by the acquisition unit; and a print setting reception unit that receives a print setting entered by the user on the print setting Web page provided by the provision unit, and receives a print request from the Web browser of the client terminal for printing data with the unregistered print device, wherein print data is created in accordance with the print setting entered via the print setting Web page displayed by the Web browser, and a print process is executed by the print server for printing the created print data using the unregistered print device.

2. The print server according to claim 1, wherein the IP address of the unregistered print device is an address selected on the Web page out of IP addresses of print devices discovered in device discovery.

3. The print server according to claim 1, further comprising a registration unit that registers the unregistered print device with the print server.

4. A control method for a print server that receives a print instruction from a Web browser of a client terminal and causes printing to be performed by a print device unregistered with the print server, comprising:

transmitting, to an authenticated Web browser of the client terminal in response to receiving a request from the Web browser of the client terminal, a Web page on which an IP address of an unregistered print device to be registered with the print server is entered;

receiving an IP address of the unregistered print device entered by a user on the Web page displayed by the Web browser of the client terminal;

generating a script that is a program for causing the Web browser of the client terminal to execute a process for acquiring device information about the unregistered print device from the unregistered print device specified by the IP address of the unregistered print device received by the receiving step;

a script transmission step of transmitting the script generated by the generation step to the Web browser of the client terminal;

acquiring the device information about the unregistered print device from the Web browser of the client terminal which has acquired the device information about the unregistered print device from the unregistered print device by executing the script generated by the generating step;

providing a print setting Web page for the unregistered print device to the Web browser, the print setting Web page being created based on the device information acquired by the acquiring step; and a print setting reception step of receiving a print setting entered by the user on the print setting Web page provided by the provision step, and receives a print request from the Web browser of the client terminal for printing data with the unregistered print device, wherein print data is created in accordance with the print setting entered via the print setting Web page displayed by the Web browser, and a print process is executed by the print server for printing the created print data using the unregistered print device.

5. A non-transitory computer-readable recording medium having recorded thereon a program for causing a computer to perform the control method for a print server according to claim 4.

6. A system including a client terminal having a Web browser, a print server that receives a print instruction from the Web browser, and a print device, comprising:

a transmission unit that transmits, to an authenticated Web browser of the client terminal in response to receiving a request from the Web browser of the client terminal, a Web page on which an IP address of an unregistered print device to be registered with the print server is entered;

a reception unit that receives an IP address of the unregistered print device entered by a user on the Web page displayed by the Web browser of the client terminal;

a generation unit that generates a script that is a program for causing the Web browser of the client terminal to execute a process for acquiring device information about the unregistered print device from the unregistered print device specified by the IP address of the unregistered print device received by the reception unit;

a script transmission step of transmitting the script generated by the generation step to the Web browser of the client terminal;

an acquisition unit that acquires the device information about the unregistered print device from the Web browser of the client terminal which has acquired the device information about the unregistered print device from the unregistered print device by executing the script generated by the generation unit;

a provision unit that provides a print setting Web page for the unregistered print device to the Web browser, the print setting Web page being created based on the device information acquired by the acquisition unit; and a print setting reception step of receiving a print setting entered by the user on the print setting Web page provided by the provision step, and receives a print request from the Web browser of the client terminal for printing data with the unregistered print device, wherein print data is created in accordance with the print setting entered via the print setting Web page displayed by the Web browser, and a print process is executed by the print server for printing the created print data using the unregistered print device.

* * * * *